US012587070B2

(12) United States Patent  
Suchoza et al.

(10) Patent No.: US 12,587,070 B2  
(45) Date of Patent: Mar. 24, 2026

(54) ELECTRIC POWER HEAD FOR OUTDOOR POWER EQUIPMENT

(71) Applicant: Greenworks (Jiangsu) Co.Ltd., Changzhou (CN)

(72) Inventors: Nicholas Suchoza, Charlotte, NC (US); David Chreene, Mooresville, NC (US); Christopher Eichel, Charlotte, NC (US); Ernest Spangler, Mooresville, NC (US)

(73) Assignee: Greenworks (Jiangsu) Co.Ltd. (CN)

( * ) Notice: Subject to any disclaimer, the term of this patent is extended or adjusted under 35 U.S.C. 154(b) by 230 days.

(21) Appl. No.: 18/565,215

(22) PCT Filed: Oct. 12, 2022

(86) PCT No.: PCT/CN2022/124819

§ 371 (c)(1),  
(2) Date: Nov. 29, 2023

(87) PCT Pub. No.: WO2024/077516

PCT Pub. Date: Apr. 18, 2024

(65) Prior Publication Data

US 2025/0096652 A1 Mar. 20, 2025

(51) Int. Cl.  
H02K 11/33 (2016.01)  
B25F 5/00 (2006.01)  
(Continued)

(52) U.S. Cl.  
CPC .......... H02K 11/0094 (2013.01); B25F 5/008 (2013.01); H01M 10/613 (2015.04);  
(Continued)

(58) Field of Classification Search  
CPC .............. B25F 3/00; B25F 5/00; H02K 11/33  
See application file for complete search history.

(56) References Cited

U.S. PATENT DOCUMENTS

2011/0007436 A1* 1/2011 Single ...................... B25F 5/00  
361/23  
2014/0216773 A1* 8/2014 Steurer .............. B23Q 11/0085  
173/176

(Continued)

FOREIGN PATENT DOCUMENTS

CN 202023724 11/2011  
CN 202023724 U * 11/2011  
(Continued)

OTHER PUBLICATIONS

CN-202023724-U—Machine Translation (Year: 2011).*  
(Continued)

*Primary Examiner* — Oluseye Iwarere  
*Assistant Examiner* — Masoud Vaziri  
(74) *Attorney, Agent, or Firm* — Shumaker, Loop & Kendrick, LLP; Brandon C. Trego

(57) ABSTRACT

An electric power head includes: a body including a mounting flange defining a mounting plane; a battery compartment disposed in the body and configured to receive one or more electric power packs; an electric motor disposed in the body and having an output shaft configured to be coupled to a mechanical load; and electronic controls configured to receive electric power from the one or more electric power packs and supply it to the electric motor.

19 Claims, 11 Drawing Sheets

(51) Int. Cl.

| | |
|---|---|
| *H01M 10/613* | (2014.01) |
| *H01M 10/6235* | (2014.01) |
| *H01M 10/6563* | (2014.01) |
| *H01M 50/247* | (2021.01) |
| *H01M 50/271* | (2021.01) |
| *H02K 5/20* | (2006.01) |
| *H02K 9/06* | (2006.01) |
| *H02K 11/00* | (2016.01) |

(52) U.S. Cl.
CPC ... *H01M 10/6235* (2015.04); *H01M 10/6563* (2015.04); *H01M 50/247* (2021.01); *H01M 50/271* (2021.01); *H02K 5/207* (2021.01); *H02K 9/06* (2013.01); *H02K 11/33* (2016.01); *B25F 5/006* (2013.01); *H01M 2220/30* (2013.01)

(56) References Cited

U.S. PATENT DOCUMENTS

| | | | | | |
|---|---|---|---|---|---|
| 2019/0059227 | A1* | 2/2019 | Conrad | .................. | A01D 34/78 |
| 2019/0341826 | A1* | 11/2019 | Zeiler | ...................... | H02K 5/16 |
| 2021/0234431 | A1* | 7/2021 | Momiyama | ........... | H02K 11/33 |
| 2023/0415325 | A1* | 12/2023 | Li | ............................. | H02K 9/06 |

FOREIGN PATENT DOCUMENTS

| | | | |
|---|---|---|---|
| CN | 210046623 | | 2/2020 |
| CN | 112405444 | | 2/2021 |
| CN | 213990214 | | 8/2021 |
| CN | 213990263 U | * | 8/2021 |
| CN | 216229213 | | 4/2022 |
| WO | 2018081397 | | 5/2018 |

OTHER PUBLICATIONS

CN-213990263-U Machine Translation (Year: 2021).*
International Search Report and Written Opinion for relating International Patent Application No. PCT/CN2022/124819 issued on May 25, 2023.

\* cited by examiner

ELECTRIC POWER HEAD FOR OUTDOOR POWER EQUIPMENT

BACKGROUND OF THE INVENTION

This invention relates generally to outdoor power equipment, and more particularly to an electric power head for outdoor power equipment.

BACKGROUND

Various types of outdoor power machines are known, including lawn mowers pressure washers, tillers, go-carts, air compressors, reel mowers, trenchers, stump grinders, edgers, and yard vacuums. In the prior art, it is common to power such outdoor power machines using internal combustion engines.

For numerous reasons including efficiency, convenience, and environmental concerns, there is a desire to power outdoor power machines using electricity, for example with storage batteries.

One problem is that re-powering such machines typically requires a new design of the complete machine incorporating electrical components instead of the internal combustion engine.

BRIEF SUMMARY OF THE INVENTION

This problem is addressed by a self-contained electric power head having an output shaft for powering a mechanical load. The electric power had may have an output shaft with a horizontal orientation.

According to one aspect of the technology described herein, an electric power head includes: a body including a mounting flange defining a mounting plane; a battery compartment disposed in the body and configured to receive one or more electric power packs; an electric motor disposed in the body and having an output shaft configured to be coupled to a mechanical load; and electronic controls configured to receive electric power from the one or more electric power packs and supply it to the electric motor.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
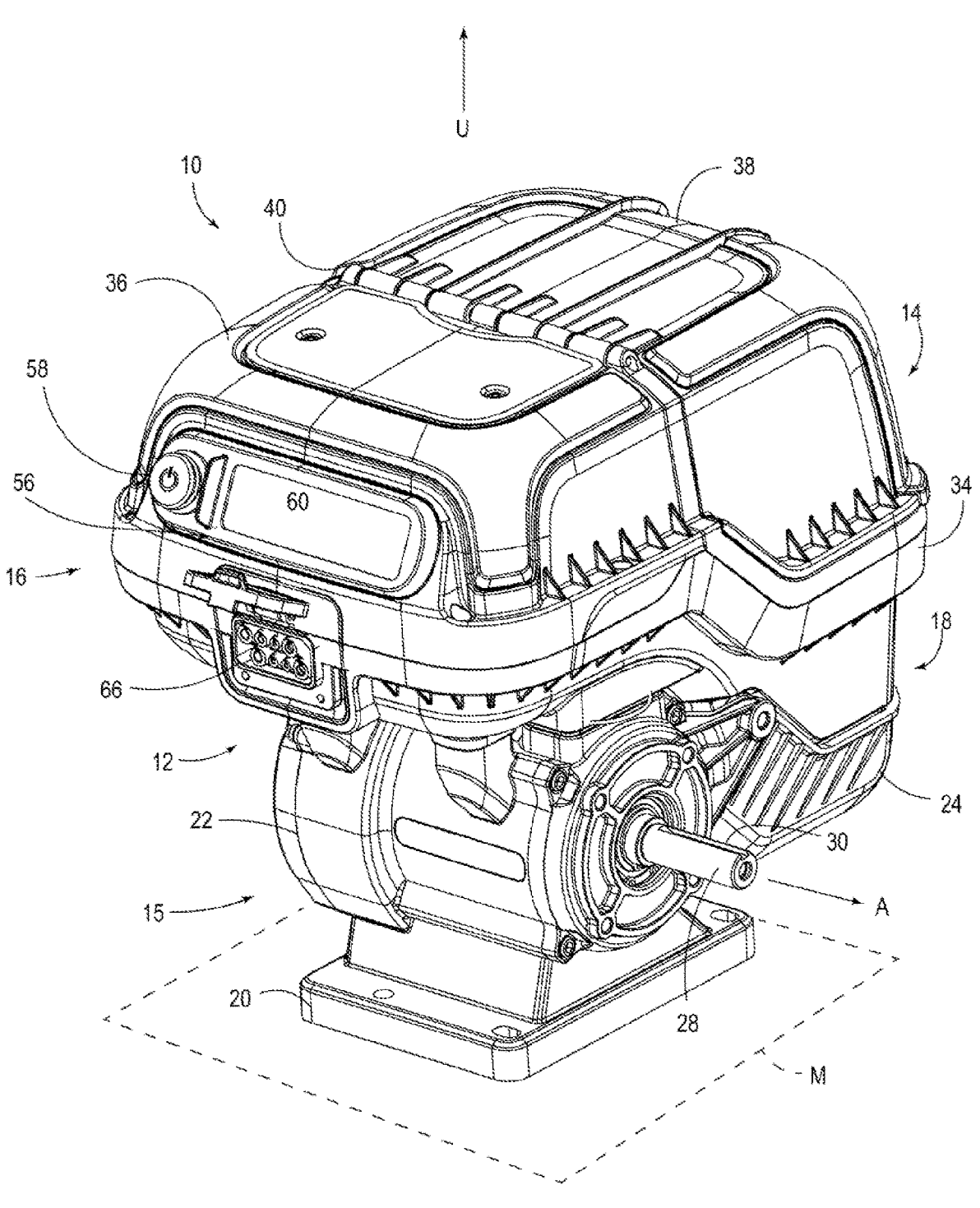
FIG. 1 is a front perspective view of an exemplary electric power head.
Figure 2:
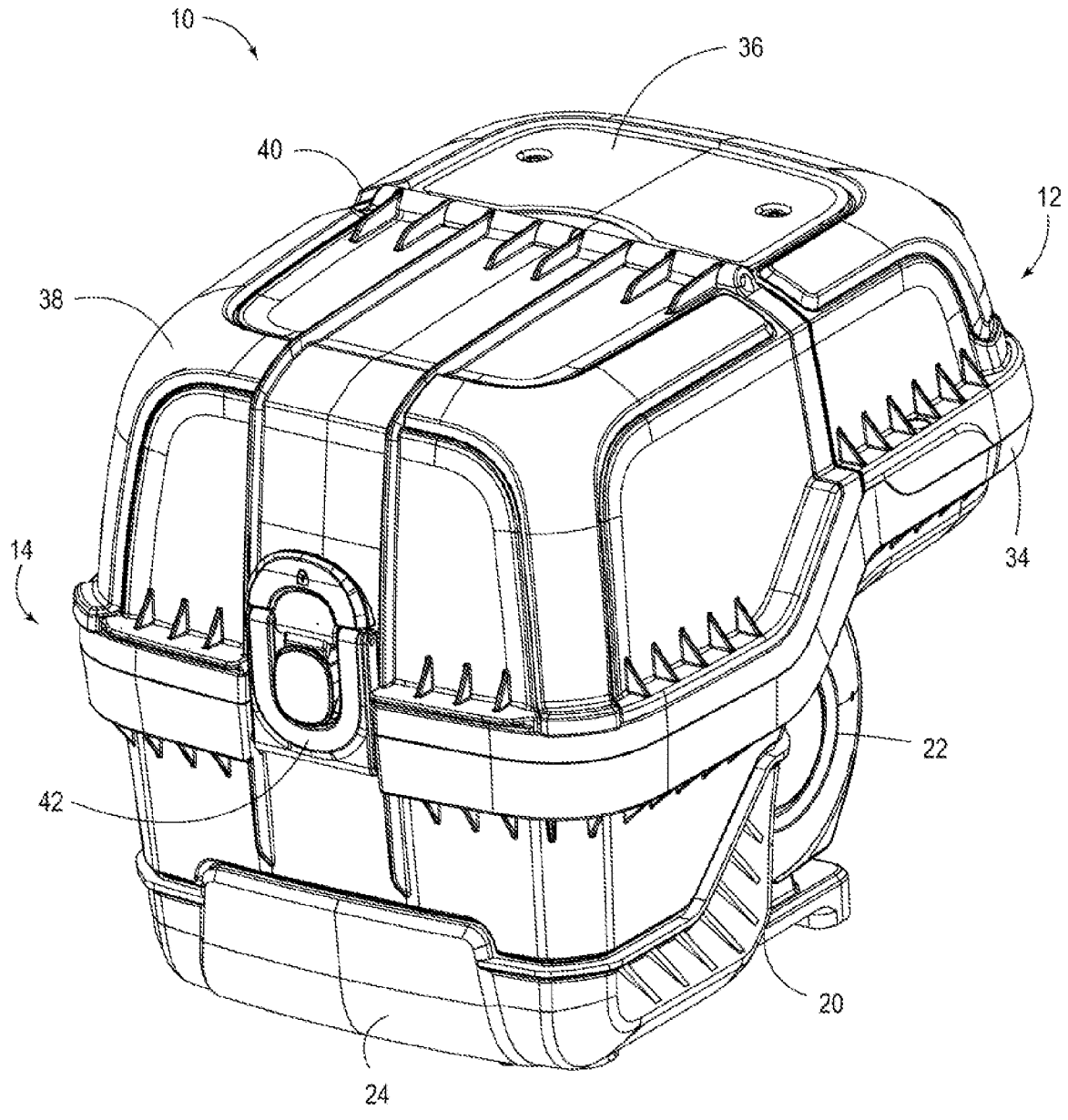
FIG. 2 is a rear perspective view of the electric power head of FIG. 1.

Referring to the drawings wherein identical reference numerals denote the same elements throughout the various views, FIGS. 1 and 2 show a representative embodiment of an electric power head (alternatively referred to simply as a "power head") 10. The machine 10 extends axially between a front end 12 and a rear end 14, and laterally between a left side 16 and a right side 18. The power head 10 has a base 15 which embodies a mounting flange 20, a motor enclosure 22, and a lower housing 24. The base 15 including all of these sub-components may be formed as a single unitary or monolithic component, for example by casting, additive manufacturing, or machining from solid material. The mounting flange 20 is configured to be mounted to an outdoor power machine or other equipment requiring mechanical power (not shown). The contact surfaces located on the bottom of the mounting flange 20 define a mounting plane "M".

An electric motor 26 (seen in FIG. 8) such as a brushless DC motor is disposed inside the motor enclosure 22. The motor 26 has an output shaft 28 which extends outward from the motor enclosure 22. It has a standard configuration for being coupled to a mechanical load (not shown), such as a belt pulley, chain cog, clutch, gearbox, transmission, or pump. In the illustrated example, (FIG. 1) the output shaft 28 includes a keyway 30 for receiving a drive key (not shown). The motor 26 incorporates a centrifugal-type primary fan 32 for cooling, located opposite the output shaft 28. The operation of the primary fan 32 is described in more detail below.

Being electrically powered, the power head 10 may be expected to operate properly in any orientation. However, for convenient reference, the power head 10 can be considered to have a nominal "up" direction indicated by arrow "U" extending normal to the mounting plane M in FIG. 1. In the illustrated example, the axis of rotation "A" of the output shaft 28 extends parallel to the mounting plane M and perpendicular to the up direction U. In one possible application, the power head 10 would be mounted with the mounting plane M horizontal, i.e. level with the earth, resulting in the output shaft 28 extending horizontally. This type of orientation may be referred to as a "horizontal shaft machine" or "horizontal power head".

While other orientations are possible, it will be understood that the horizontal orientation makes power head 10 especially suitable for use with certain types of outdoor power machines.

Nonlimiting examples of outdoor power machines that may use this type of power head 10 include pressure washers, tillers, go-carts, air compressors, reel mowers, trenchers, stump grinders, edgers, and yard vacuums.

A middle housing 34 is disposed above the base 15 and serves to enclose various internal components of the power head 10. The middle housing may be mounted to the base 15 using resilient elements such as rubber isolators in order to dampen vibration.

An upper housing 36 is disposed above the middle housing 34, located towards the front end 12 of the power head 10.

A battery cover 38 (FIG. 2) is disposed above the middle housing 34, located towards the rear end 14 of the power head 10. Means are provided for easily opening or removing the battery cover 38. In the illustrated example, the battery cover 38 is connected to the upper housing 36 at a hinge 40 and is secured in the closed position with a latch 42. The battery cover 38 may be provided with a gasket (not labeled) to provide resistance against water and debris entry.

Collectively, the base 15, the middle housing 34, the upper housing 36, and the battery cover 38 define a "body" of the power head 10.

Figure 3:
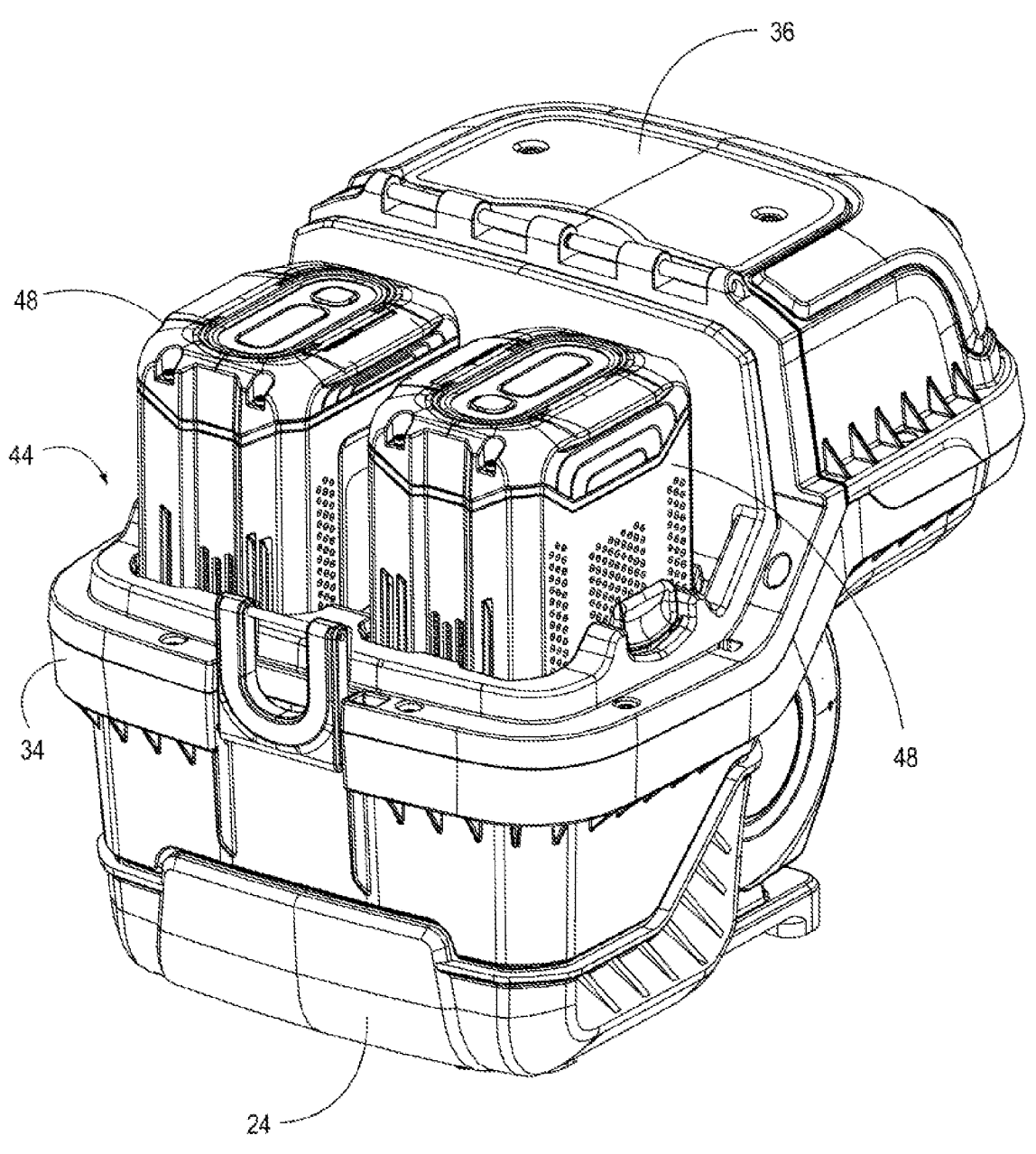
FIG. 3 is a rear perspective view of the electric power head of FIG. 1, with a battery cover removed.
Figure 4:
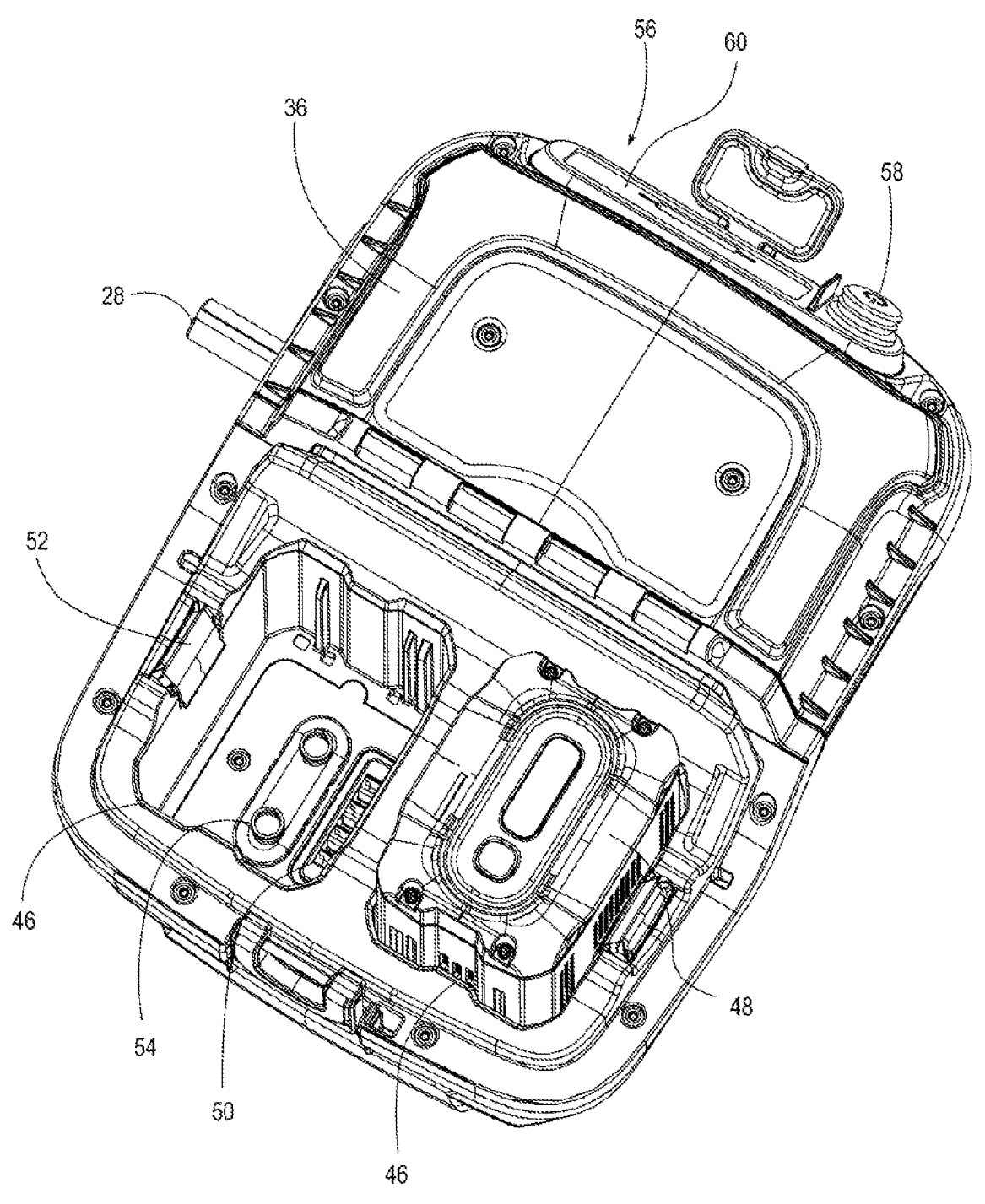
FIG. 4 is a top view of the electric power head of FIG. 1, with a battery cover removed, showing a battery receptacle.

Referring to FIGS. 3 and 4, the middle housing 34 and the lower housing 24 collectively define a battery compartment 44 which includes one or more receptacles 46 for receiving electric power packs 48. Each receptacle 46 may include electrical contacts 50, a movable catch 52 for engaging and retaining an electric power pack 48 in the receptacle 46, and a preload spring 54 for retaining the electric power pack 48 in position against the catch 52.

The battery cover 38 is movable between an open position in which the battery compartment 44 is accessible, and a closed position in which the battery compartment 44 is closed off.

The power head 10 is powered by one or more electric power packs 48 suitable for storing and discharging electrical energy. In the illustrated example, each electric power pack 48 is a storage battery including one or more chemical cells, for example lithium ion cells. Other liquid battery chemistries may be substituted, as well as solid state batteries, capacitors, or similar devices which may exist currently or be later developed. The electric power pack 48 may include ancillary electrical components such as, transformers, voltage converters, relays, circuit breakers, and/or sensors. In the illustrated example, the electric power pack 48 includes at least one set of terminals providing a high voltage output (e.g. 82 V) for operating the power head 10.

The front end 12 of the power head 10 includes appropriate user controls 56 such as switches, pushbuttons, touch screens, as well as displays or indicators. In the illustrated example, the user controls 56 include a power switch 58 and a combined membrane switch/display 60.

The user controls 56 may include a battery charge indicator which displays an overall charge for all connected power sources. They may include the ability to display error codes to communicate malfunctions for the purpose of troubleshooting. The user controls 56 may also enable the operation of the motor 26 at different speeds for different uses.

Figure 5:
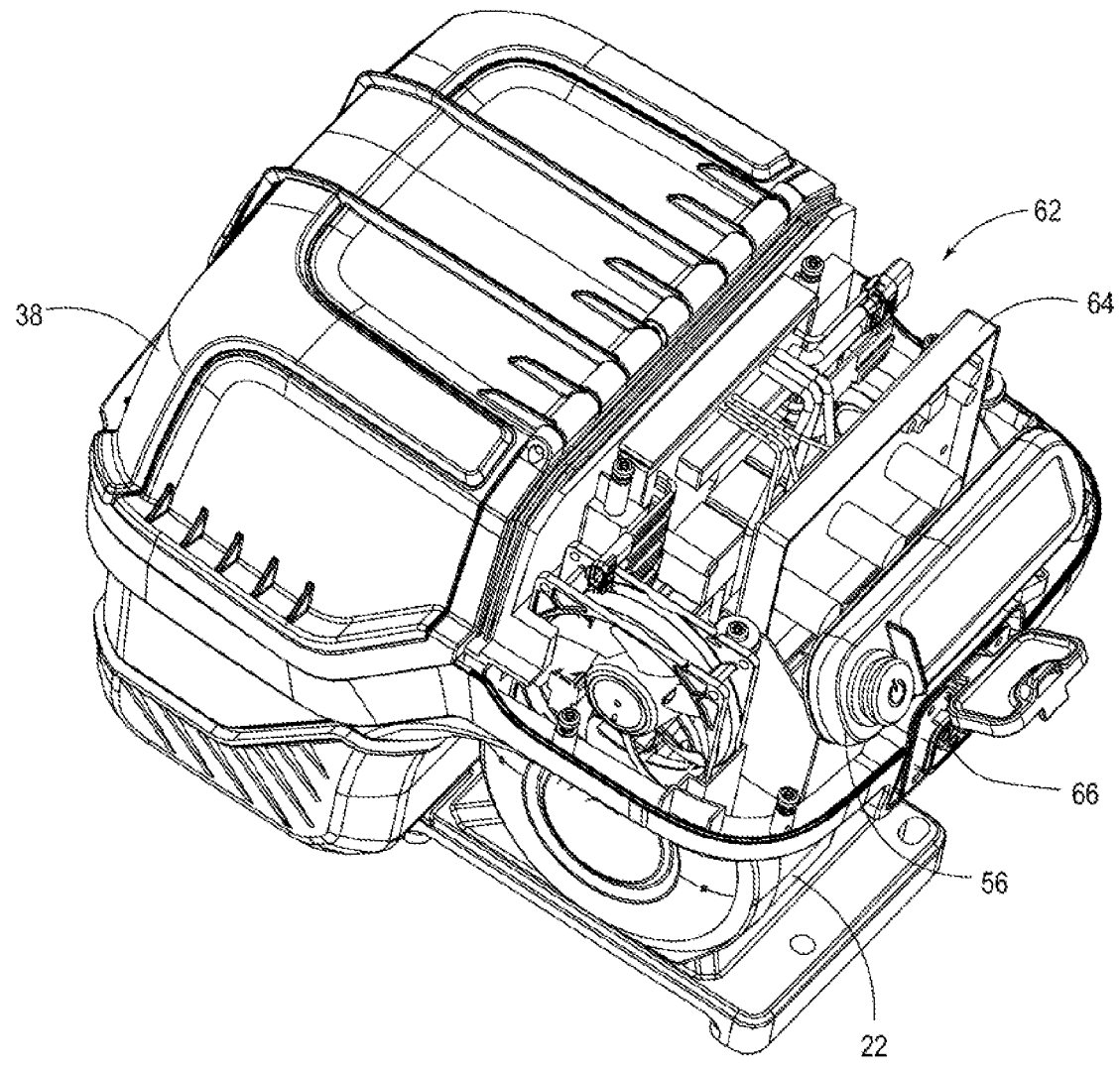
FIG. 5 is a front perspective view of the electric power head of FIG. 1, with an upper housing removed.

Referring to FIG. 5, the space above the motor 26, between the middle housing 34 and the upper housing 36, referred to as a "control compartment" 62, includes one or more electronic controls 64 for receiving electric power from the electric power packs 48 and supplying it to the motor 26. The electronic controls 64 may include may include electrical components such as: rectifiers, transformers, voltage converters, relays, circuit breakers, microprocessors, and/or sensors. The electronic controls 64 may also be configured to receive power from an external source such as AC mains power (via external connector 66) and charge the electric power packs 48, performing AC to DC conversion and/or voltage conversion as required. The electronic controls 64 may also be configured to receive power from an external source such as AC mains power (via external connector 66) and provide power directly to the motor 26 performing AC to DC conversion and/or voltage conversion as required. The electronic controls 64 may also be configured to receive power from the electric power packs 48 and supply power to another electrical load, performing AC to DC conversion and/or voltage conversion as required. For example, the power head 10 may be used to supply 120 VAC electric power via suitable receptacle or connector (not shown).

Figure 6:
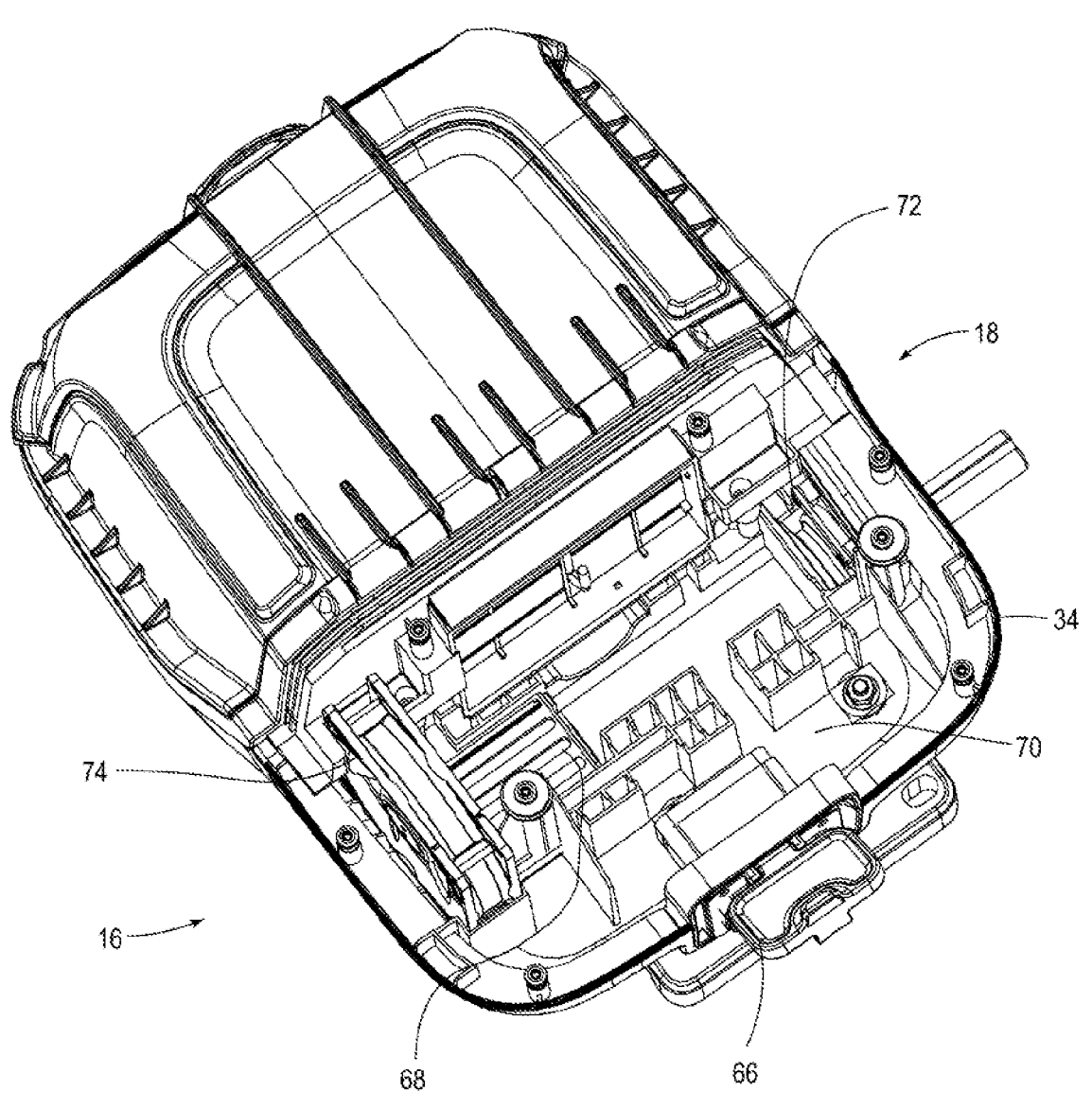
FIG. 6 is a top view of the electric power head of FIG. 1, with an upper housing and electronic controls removed.
Figure 9:
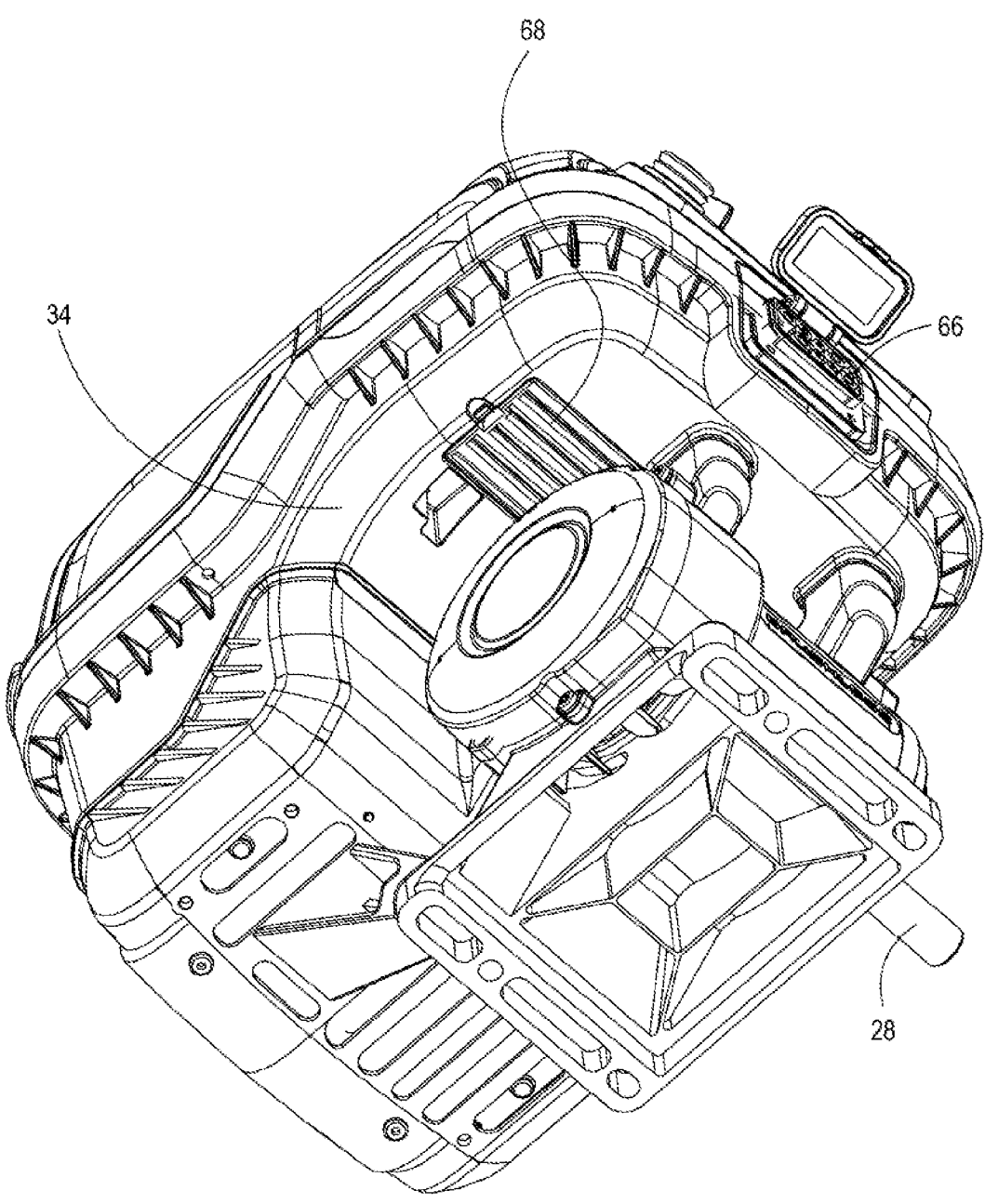
FIG. 9 is a bottom perspective view of the electric power head of FIG. 1.

The power head 10 may incorporate means for forced air cooling of the control compartment 62 and/or the motor 10. Referring to FIGS. 6 and 9, in the illustrated example, a cooling inlet 68 is disposed in a bottom wall 70 of the middle housing 34, near the left side 16 of the power head 10. A flow path is present between the cooling inlet 68 and a transfer duct 72 communicating with the bottom wall 70, near the right side 18 of the power head 10. An electrically-driven secondary fan 74 is disposed in the control compartment 62 adjacent the cooling inlet 68. Its function is to force air flow from the cooling inlet 68 laterally through the control compartment 62 across the electronic controls 64 and to the transfer duct 72.

Figure 7:
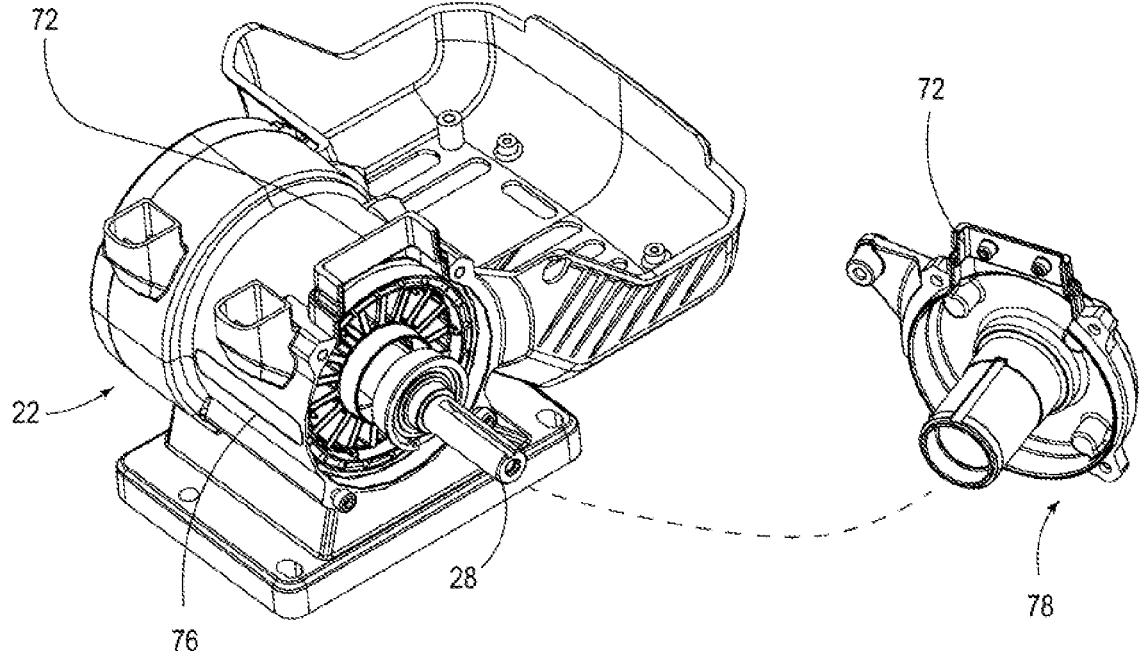
FIG. 7 is an exploded view of a lower portion of the electric power head of FIG. 1.

The structure of the transfer duct 72 is shown in more detail in FIG. 7. A portion of the transfer duct 72 is defined by the generally cylindrical main body 76 of the motor enclosure 22. The remaining portion is defined by a right end cap 78 which mates with the main body 76. Together these elements define a flow path from the control compartment 62, through the motor enclosure 22, around and/or through the motor 26.

Figure 8:
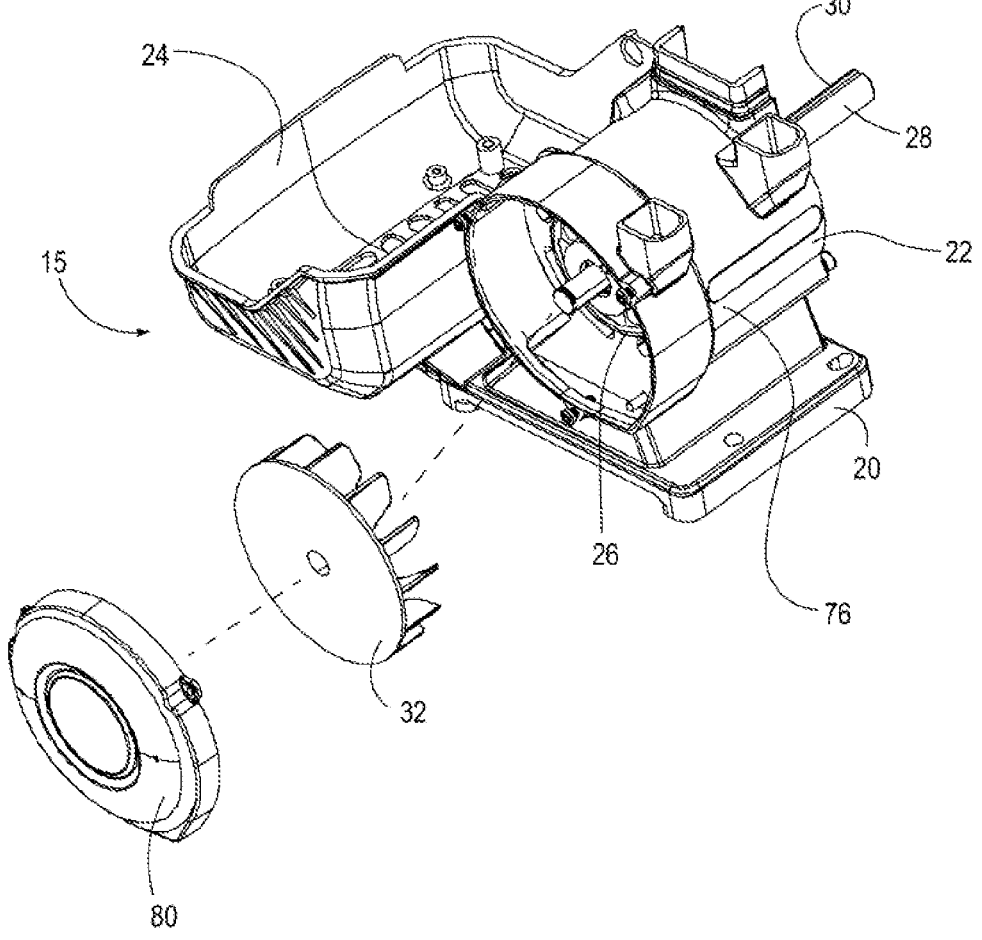
FIG. 8 is another exploded view of a lower portion of the electric power head of FIG. 1.
Figure 10:
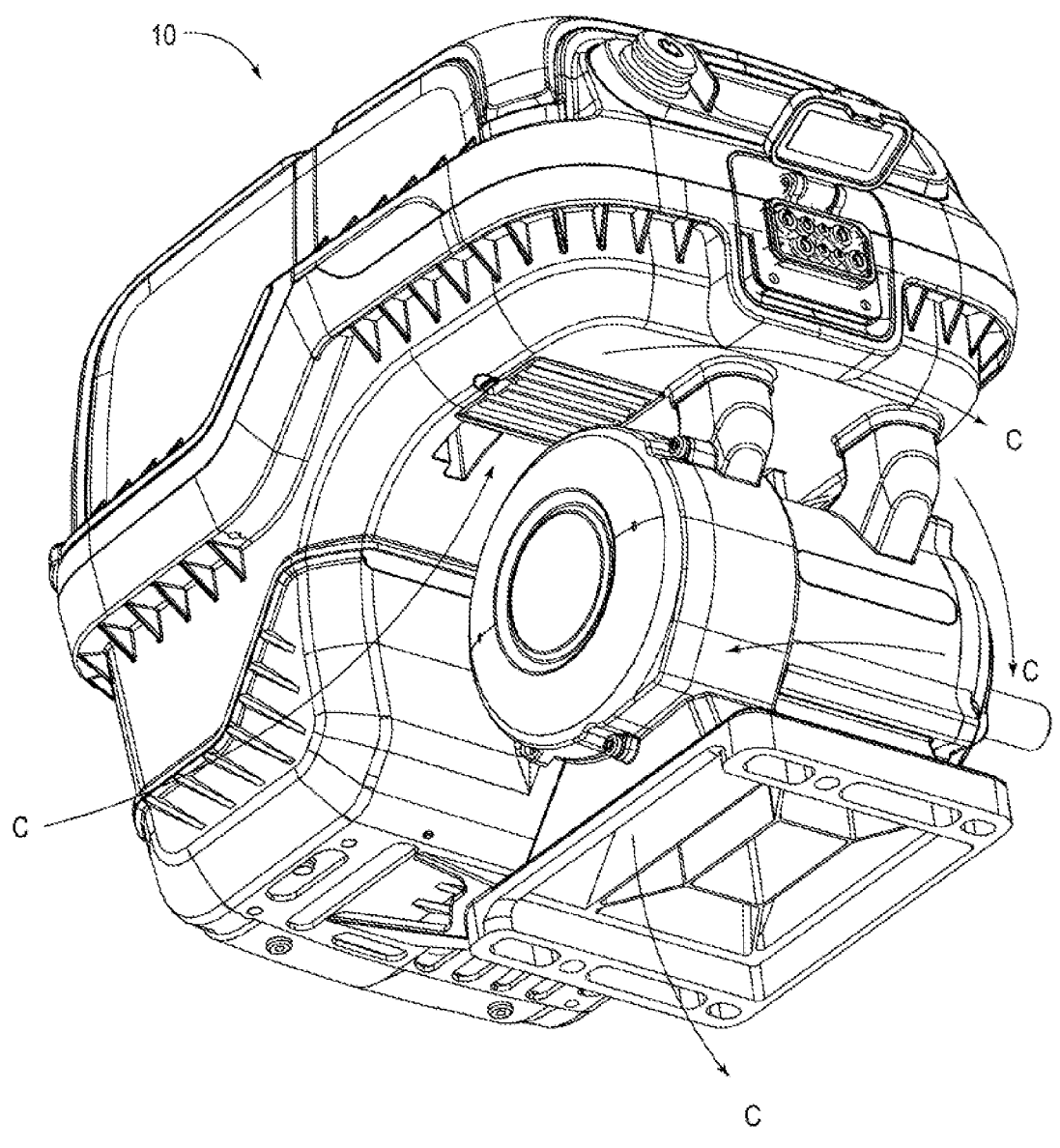
FIG. 10 is another bottom perspective view of the electric power head.

The opposite end of the motor enclosure 22 is seen in FIG. 8. A left end cap 80 mates with the main body 76. The primary fan 32 is positioned between the motor 26 and this left end cap 80. Its function is to force air flow through the motor enclosure 22, from the transfer duct 72, around and/or through the motor 26. The spent cooling air exits the motor enclosure 22 through a cooling air outlet 82, best seen in FIG. 9. Arrows "C" in FIG. 10 depict the complete cooling air flow path.

Figure 11:
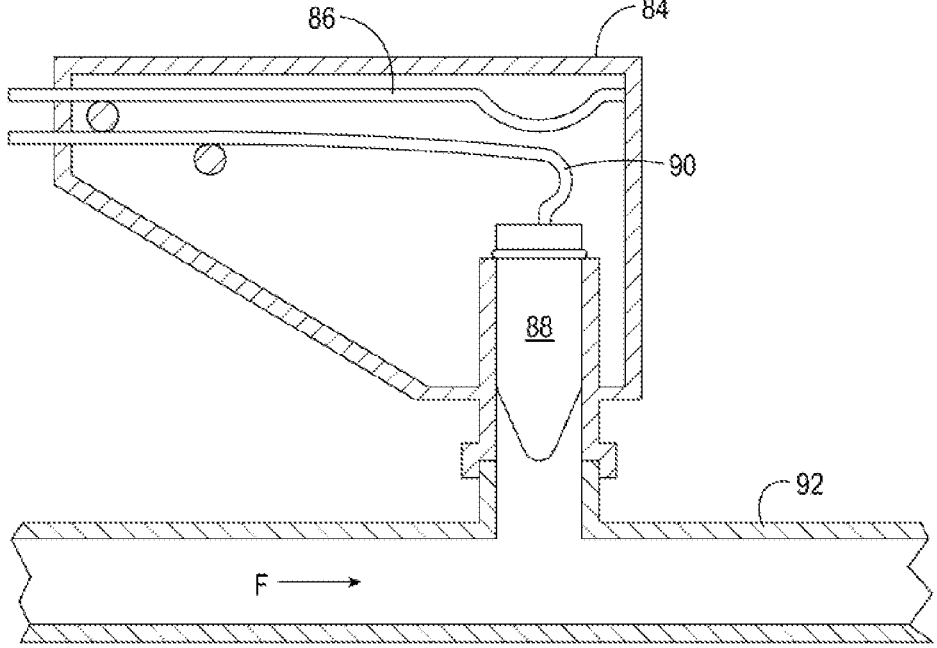
FIG. 11 is a partially-sectioned view of a stop switch for use with the electric power head.

Optionally, the power head 10 may incorporate a stop switch 84, a representative example of which is shown in FIG. 11. In the illustrated example, the stop switch 84 includes a fixed electrical contact 86 and a moveable plunger 88 connected to a moveable electrical contact 90. The movable electrical contact 90 is a spring element urging the plunger 88 towards a lowered position. In use, the stop switch 84 would be connected to a line 92 carrying fluid flow as shown by the arrow "F", such that the plunger 88 is in contact with the fluid F. The plunger 88 and movable electrical contact 90 are configured such that fluid pressure and/or flow rate above a threshold value will cause the plunger 88 to rise against the spring pressure and bring the electrical contacts 86, 90 into physical contact, completing an electrical circuit therebetween. Other types of pressure or flow sensing devices may be used for this function.

The stop switch 84 is operably connected to the electronic controls. The electronic controls 64 or other relevant circuitry within the power head 10 are configured to respond to the signal from the stop switch 84. For example, the electronic controls 64 may be configured to prevent operation of the motor 10 in the absence of a threshold pressure or flow, and to permit operation of the motor 10 in the presence of threshold pressure and flow. This function can prevent the our head 10 from running continuously, avoiding wear and power drain, when active use is not required. This may be helpful when powering tools such as pressure washers or air compressors. For example, in the case of a pressure washer, the stop switch 84 would only permit the motor 10 to operate when the user is open the valve permitting the flow of water through the pressure washer.

The stop switch 84 may be physically incorporated into the power head 10 or it may be provided externally.

The power head 10 can be used to power any type of outdoor power machine or other machine having a mechanical load to be driven. It can be mounted as a direct replacement for a conventional internal combustion engine.

The foregoing has described an electric power head. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

What is claimed is:

1. An electric power head, comprising:
a body including a base having a lower housing and a mounting flange defining a mounting plane, a middle housing disposed above the base, an upper housing disposed above the middle housing, and a battery cover disposed above the middle housing and hinged to the upper housing;
a battery compartment disposed in the body and configured to receive one or more electric power packs;
an electric motor disposed in the base and having an output shaft configured to be coupled to a mechanical load; and
electronic controls configured to receive electric power from the one or more electric power packs and supply it to the electric motor, wherein the electronic controls are disposed in a control compartment disposed between the middle housing and the upper housing.

2. The electric power head of claim 1, wherein an axis of rotation of the output shaft is oriented parallel to the mounting plane.

3. The electric power head of claim 1, wherein:
the base includes a motor enclosure which houses the electric motor; and
the body defines a cooling air flow path extending from a cooling air inlet located in the control compartment, through the control compartment, into the motor enclosure, to a cooling air outlet located in the motor enclosure.

4. The electric power head of claim 3, wherein the electric motor includes a primary fan communicating with the cooling outlet.

5. The electric power head of claim 1, further comprising a secondary fan positioned in the control compartment.

6. The electric power head of claim 3, wherein the cooling air flow path includes a transfer conduit interconnecting the control compartment and the motor enclosure.

7. The electric power head of claim 1, further comprising a stop switch operably connected to the electronic controls and configured to sense a fluid pressure or a fluid flow rate and generate a signal representative thereof.

8. The electric power head of claim 7, wherein the control electronics are configured to prevent the electric motor from operating in response to a fluid pressure or a fluid flow rate being less than a threshold value, and to permit the electric motor to operate in response to the fluid pressure or the fluid flow rate being greater than the threshold value.

9. The electric power head of claim 1, wherein the base further includes a motor enclosure.

10. The electric power head of claim 9 wherein the electric motor is disposed in the motor enclosure.

11. The electric power head of claim 1, wherein the lower housing and the middle housing collectively define the battery compartment.

12. The electric power head of claim 11, wherein the battery compartment includes one or more receptacles for individual electric power packs.

13. The electric power head of claim 1, wherein the battery cover is movable between an open position in which the battery compartment is accessible, and a closed position in which the battery compartment is closed off.

14. The electric power head of claim 1, in combination with one or more electric power packs received in the battery compartment.

15. An electric power head, comprising:
a body including a base having a lower housing, a middle housing disposed above the base, and an upper housing disposed above the middle housing;
a cooling inlet disposed in a bottom wall of the middle housing;
a battery compartment disposed in the body and configured to receive one or more electric power packs, the battery compartment defined by the lower housing and middle housing collectively;
an electric motor disposed in the base and having an output shaft configured to be coupled to a mechanical load; and
electronic controls configured to receive electric power from the one or more electric power packs and supply it to the electric motor.

16. The electric power head of claim 15, further including a battery cover disposed above the middle housing and hinged to the upper housing.

17. The electric power head of claim 15, wherein the battery compartment includes at least one preload spring to retain the one or more electric power packs in position against a catch.

18. The electric power head of claim 15, wherein the electronic controls are disposed in a control compartment disposed between the middle housing and the upper housing.

19. An electric power head, comprising:
a body including a base having a lower housing, a middle housing disposed above the base, and an upper housing disposed above the middle housing;
a cooling inlet disposed in a bottom wall of the middle housing;
a battery compartment disposed in the body and configured to receive one or more electric power packs;
an electric motor disposed in the body and having an output shaft configured to be coupled to a mechanical load; and
electronic controls configured to receive electric power from the one or more electric power packs and supply it to the electric motor, wherein the electronic controls are disposed in a control compartment disposed between the middle housing and the upper housing.

* * * * *